United States Patent
Archer et al.

(10) Patent No.: US 10,793,479 B2
(45) Date of Patent: Oct. 6, 2020

(54) ACCELERATOR FOR HYDRAULIC COMPOSITION

(71) Applicant: FINE POWDER TECHNOLOGIES PTY LTD, Toowoomba, Queensland (AU)

(72) Inventors: Michael Scott Archer, Newtown (AU); Paul Duncan Hywel-Evans, Mundoolun (AU)

(73) Assignee: FINE POWDER TECHNOLOGIES PTY LTD, Toowoomba, Queensland (AU)

(*) Notice: Subject to any disclaimer, the term of this patent is extended or adjusted under 35 U.S.C. 154(b) by 184 days.

(21) Appl. No.: 16/065,799

(22) PCT Filed: Dec. 22, 2016

(86) PCT No.: PCT/AU2016/051271
§ 371 (c)(1),
(2) Date: Jun. 23, 2018

(87) PCT Pub. No.: WO2017/106920
PCT Pub. Date: Jun. 29, 2017

(65) Prior Publication Data
US 2019/0010092 A1    Jan. 10, 2019

(30) Foreign Application Priority Data

Dec. 23, 2015 (AU) .................... 2015905358
Dec. 23, 2015 (AU) .................... 2015905359
Oct. 27, 2016 (AU) .................... 2016904374

(51) Int. Cl.
| | | |
|---|---|---|
| C04B 40/00 | (2006.01) | |
| C04B 28/02 | (2006.01) | |
| C04B 28/06 | (2006.01) | |
| C04B 22/10 | (2006.01) | |
| C04B 22/14 | (2006.01) | |
| C04B 24/10 | (2006.01) | |
| C04B 28/04 | (2006.01) | |
| C04B 111/00 | (2006.01) | |
| C04B 103/14 | (2006.01) | |

(52) U.S. Cl.
CPC .......... *C04B 40/0046* (2013.01); *C04B 22/10* (2013.01); *C04B 22/148* (2013.01); *C04B 24/10* (2013.01); *C04B 28/02* (2013.01); *C04B 28/04* (2013.01); *C04B 28/065* (2013.01); *C04B 40/0039* (2013.01); *C04B 2103/14* (2013.01); *C04B 2111/00155* (2013.01); *C04B 2111/00577* (2013.01); *Y02W 30/92* (2015.05); *Y02W 30/94* (2015.05)

(58) Field of Classification Search
CPC ........ C04B 22/10; C04B 22/148; C04B 24/10; C04B 28/02; C04B 28/04; C04B 28/065; C04B 40/0039; C04B 40/0046; C04B 2103/14; C04B 2111/00155; C04B 2111/00577
See application file for complete search history.

(56) References Cited

U.S. PATENT DOCUMENTS

| | | | |
|---|---|---|---|
| 4,798,628 A | | 1/1989 | Mills et al. |
| 4,875,937 A | | 10/1989 | Viles |
| 7,326,478 B2 | | 2/2008 | Bouscal et al. |
| 8,366,823 B2 | | 2/2013 | Perez-Pena |
| 8,551,245 B2 | | 10/2013 | Guynn et al. |
| 9,296,653 B2 | | 3/2016 | Kim-Habermehl et al. |
| 2007/0054059 A1 | * | 3/2007 | Nakashima .......... C04B 22/126 427/427 |
| 2008/0141907 A1 | | 6/2008 | Campbell |
| 2014/0311387 A1 | | 10/2014 | Hohn et al. |
| 2014/0371351 A1 | | 12/2014 | Dantin et al. |

FOREIGN PATENT DOCUMENTS

| | | | | |
|---|---|---|---|---|
| CN | 101439943 A | * | 5/2009 | ......... C04B 22/0093 |
| CN | 102690077 A | | 9/2012 | |
| EP | 0290394 B1 | | 10/1990 | |
| FR | 2680130 A1 | | 2/1993 | |
| GB | 2347415 A | | 9/2000 | |
| GB | 2464596 A | | 4/2010 | |
| WO | 2009/015520 A1 | | 2/2009 | |
| WO | 2015078985 A1 | | 6/2015 | |

OTHER PUBLICATIONS

International Search Report for PCT/AU2016/051271 dated Jan. 27, 2017, 5 pages.
Written Opinion of the International Searching Authority for PCT/AU2016/051271 dated Jan. 27, 2017, 4 pages.
Third Party Observation for PCT/AU2016/051271 dated Jun. 30, 2017, 1 page.

* cited by examiner

*Primary Examiner* — Anthony J Green
(74) *Attorney, Agent, or Firm* — Brooks Kushman P.C.

(57) ABSTRACT

A method of making a liquid hardening accelerator for a hydraulic composition the method comprising: (at adding sugar and lithium carbonate to water to form a dispersion of the lithium carbonate in a sugar solution; (b) adding aluminium sulphate to the dispersion to form a liquid hardening accelerator.

20 Claims, No Drawings

ACCELERATOR FOR HYDRAULIC COMPOSITION

CROSS-REFERENCE TO RELATED APPLICATION

This application is the U.S. national phase of PCT Application No. PCT/AU2016/051271 filed on Dec. 22, 2016, which claims priority to AU Patent Application No. 2015905358 filed on Dec. 23, 2015, AU Patent Application No. 2015905359 filed on Dec. 23, 2015, and AU Patent Application No. 2016904374 filed on Oct. 27, 2016, the disclosures of which are incorporated in their entirety by reference herein.

TECHNICAL FIELD

The present invention relates to a method for the production of a liquid hardening accelerator for hydraulic compositions and to the use of the accelerator thus made in methods of producing cured articles.

BACKGROUND OF INVENTION

Hydraulic compositions are used in the formation of a number of different (but related products) including grouts, cements and concretes and the production of each of these materials is typically very similar. For example concrete products are typically produced by first forming a hydraulic composition by mixing a cement, an aggregate and water to form a hydraulic composition which immediately starts to cure. The composition may contain a number of other additives such as dispersants, fillers, colourants and the like but the general process remains the same. Typically once mixed the composition is placed into its desired final form and then allowed to cure.

For a number of these products the rate of cure or hardening is very important as in remote areas such as mine sites where the batching plant may be several hours away from point of use, it may be necessary to retard the concrete for transport. However, in use it is important that they exhibit a high strength at an early age in order to increase productivity and throughput. Accordingly a significant amount of work has been carried out on methods and additives to increase the rate of hardening such as by varying the physical conditions under which the composition is hardened or by varying additives to increase the rate of hardening. Due to the wide variety of cementitious materials used in products of these types there is significant variability in the ways in which hardening can be accelerated.

A wide variety of cementitious materials are currently commercially available. A cementitious material is any material or materials which can be mixed with a liquid, such as water and then cured to form a hardened product. Cementitious materials include cements, lime, fly ash, mortar, ground granulated blast furnace slag (GGBS), silica fume, calcined clay, calcined shale, refractory cements, gypsum, expanding cements, sand, rice hull ash, quartz, silica, amorphous silicon dioxide, pozzolanic materials or the like.

Hydraulic cements are powders that react with water to generate hard, solid matrices that continue to increase in compressive strength even when the matrix is placed in excess water. Within this category are Portland cement (PC), alumina cements (AC's & CAC's), calcium sulphoaluminate cements (also described as sulphoaluminate belite cements), pozzolanic slags, fuel ashes and other siliceous glasses.

Portland cement is the most common form of hydraulic cementitious material. 'Cement' is a generic term used to describe a material comprising organic and inorganic binding agents. The most common cements are hydraulic cements which are materials which set and harden after combining with water, as a result of chemical reactions with the mixing of water and after hardening, retain strength and stability even upon exposure to water.

Concrete is most commonly formed from Portland cement and the concrete is typically manufactured in a ready-mix plant. Typically, hydration of Portland cement is accelerated before bulk placing by modifying the bulk of the batch just before placing by using accelerators such as calcium chloride, sodium silicate, sodium aluminate or aluminium sulphate, or by increasing the fineness of grind of the parent cement. However, calcium chloride and sodium silicate are corrosive while sodium aluminate is extremely hazardous in case of skin or eye contact as well as inhalation or ingestion. Increasing the fineness of grind also has a diminishing return in terms of increased activity and energy investment.

While aluminium sulphate can be less corrosive or hazardous than the above accelerators, it is difficult to use due to its low solubility. Attempts have been made to increase aluminium sulphate solubility including dissolving amorphous aluminium hydroxide within aluminium sulphate in the presence of sulfuric acid to increase aluminium sulphate content to about 9-10%. However, this approach is not stable as the aluminium sulphate precipitates from the mixture. Accordingly, additional accelerators are frequently used to compensate for the instability of aluminium sulphate precipitation; although again this approach increases costs and can be detrimental to the long term hydration of the Portland cement in concrete, effectively "poisoning" the long term compressive strength.

There have also been attempts made to use lithium accelerators in the hardening of hydraulic compositions especially hydraulic compositions that contain significant amounts of aluminium. A difficulty with these accelerators can be that the solubility of the lithium salt used may be low leading to a reduction in the speed at which any lithium accelerator works.

Accordingly, it is desirable to develop methods of producing accelerators for hydraulic compositions that can be produced in relatively straight forward ways on site at the desired point of use.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

SUMMARY OF INVENTION

As a result of research into developing improved hardening accelerators the applicants have developed a method of producing a liquid hardening accelerator and a method of producing a cured article from a hydraulic composition using the accelerator produced by the methods of the present invention.

Accordingly, in one embodiment the present invention provides a method of making a liquid hardening accelerator for a hydraulic composition the method comprising: adding sugar and lithium carbonate to water to form a dispersion of the lithium carbonate in a sugar solution; and adding aluminium sulphate to the dispersion to form a liquid hardening accelerator.

The applicants have found that the method produces a solution containing both lithium and aluminium species that is readily able to be used as a hardening accelerator at the desired point of use. In addition the method of producing the accelerator is such that the accelerator may be produced on site at the point of application leading to saving in terms of transportation and the like.

As discussed above the hardening accelerator produced by the methods of the present invention may be used to accelerate the hardening of a hydraulic composition to produce a cured article.

Accordingly, in yet a further embodiment the present invention provides a method of producing a cured article from a hydraulic composition, the method comprising mixing the hydraulic composition with a liquid hardening composition produced by the method of the invention.

DETAILED DESCRIPTION

As discussed above the present invention provides a method of making a liquid hardening accelerator for a hydraulic composition. As the accelerator is made in liquid form it is readily able to be added to a hydraulic composition to allow for the accelerator to impact on the rate of hardening of the hydraulic composition. Indeed as the method of the present invention produces a liquid accelerator it may be added in any way known in the art for the addition of liquids to hydraulic compositions. For example it may be added to the bulk blend such as the mixer of a delivery vehicle or it may be added in line in a pumping operation such as in the spraying of shotcrete. Accordingly the provision of the accelerator in a liquid form provides a number of advantages in its final use and application.

The first step in the process of formation of the liquid hardening accelerator is the formation of a dispersion of lithium carbonate in a sugar solution. The dispersion is produced by adding sugar and lithium carbonate to water to produce a dispersion of lithium carbonate in a sugar solution.

In the method of the present invention the water may be at any suitable temperature. In one embodiment the water is at a temperature of from 20° C. to 40° C. In one embodiment the water is at a temperature of from 20° C. to 30° C. In one embodiment the water is at a temperature of from 30° C. to 40° C.

The addition of the sugar and the lithium carbonate to the water may be carried out in a number of ways. For example the sugar and lithium carbonate may be added either simultaneously or sequentially. In one embodiment the sugar and lithium carbonate are added simultaneously. In one embodiment the sugar and lithium carbonate are added sequentially.

In relation to sequential addition of the sugar and the lithium carbonate the applicants have found that the order of addition is not important to the success of the process. In one embodiment the sugar is added first followed by the lithium carbonate. In one embodiment the lithium carbonate is added first followed by the sugar.

The sugar may be added either as a solid which will dissolve or partially dissolve in the water or it may be added in the form of a concentrated solution where a solution of the sugar dissolved in water is added to the water in which the liquid hardening accelerator is to be produced.

The lithium carbonate is typically added to the water in the form of a powder. The powder may be any of a number of suitable particle sizes although in general the applicants have found that a finer particle size works more efficiently.

In embodiments where the lithium carbonate and the sugar are added simultaneously this may be done where the sugar and the lithium carbonate are added separately but at the same time or it may be done by first admixing the sugar and the lithium carbonate to form an admixture followed by addition of the admixture to the water.

During addition of the sugar and the lithium carbonate as described above the water may be agitated during addition of the sugar and/or the lithium carbonate. In one embodiment the water is agitated during addition of the sugar. In one embodiment the water is added during addition of the lithium carbonate. The applicants have found that agitation of the water during addition of the lithium carbonate aids in the formation of the dispersion and helps to ensure that the lithium carbonate is relatively evenly dispersed throughout the dispersion.

The water may be agitated using any means known in the art. For example the water may be agitated or mixed in an apparatus where the container per se rotates thus leading to agitation of the water or there may be a mixing element that rotates causing agitation of the water. A skilled worker in the field could readily appreciate the ways in which the water may be agitated.

The method of the present invention may use a wide range of sugars. Examples of suitable sugars include monosaccharides, polysaccharides and combinations thereof. In certain embodiments, the sugar is selected from the group consisting of glucose, fructose, lactose, maltose, sucrose, trehalose, raffinose and combinations thereof. In one embodiment, the sugar is sucrose. As will be appreciated by a skilled addressee the exact sugar chosen will typically be dictated by commercial considerations. Accordingly the sugar chosen will be selected based on the availability of the sugar in the location in which the process is to be carried out and the cost of the available sugars. In general due to the nature of product cost considerations will weigh heavily on the decision making process.

The amount of sugar used in the process of the present invention may vary widely with the applicants finding that the process will work over a wide range of sugar concentrations. Nevertheless the amount of sugar added to the water will typically be from 0.1 g to 30 g per 100 ml of water. In one embodiment the amount of sugar added is from 0.1 g to 20.0 g per 100 ml of water. In one embodiment the amount of sugar added is from 1.0 to 20.0 g per 100 ml of water. In one embodiment the amount of sugar added is from 5.0 to 15.0 g per 100 ml of water The amount of lithium carbonate used in the process of the present invention may vary widely with the applicants finding that the process will work over a wide range of lithium carbonate concentrations. Nevertheless the amount of lithium carbonate added to the water will typically be from 0.1 g to 30.0 g per 100 ml of water. In one embodiment the amount of lithium carbonate added is from 0.1 to 20.0 g per 100 ml of water. In one embodiment the amount of lithium carbonate added is from 1.0 g to 20.0 g per 100 ml of water. In one embodiment the amount of lithium carbonate added is from 5.0 g to 15.0 g per 100 ml of water.

Once the dispersion of lithium carbonate in a sugar solution has been produced the next step in the process is the addition of aluminium sulphate. The aluminium sulphate may be added in any suitable form although typically it is added in the form of a powder. The particle size of the aluminium sulphate may vary widely although typically the particle size is from 0.1 micron to 9 mm.

The applicants have found that addition of the aluminium sulphate to the dispersion typically leads to the generation of a gas as the solution effervesces. Without wishing to be bound by theory it is thought that the gas is $CO_2$ which is a result of the reaction of lithium carbonate and aluminium sulphate generating sulphuric acid with the soluble lithium salt. Accordingly the applicants have found that it is desirable to add the aluminium sulphate to the dispersion over a period of time in order to control the effervescence and to optimise the reaction. The addition of the aluminium sulphate typically takes from 1 to 20 minutes.

During addition of aluminium sulphate the water may be agitated. The water may be agitated using any means known in the art. For example the water may be agitated or mixed in an apparatus where the container per se rotates thus leading to agitation of the water or there may be a mixing element that rotates causing agitation of the water. A skilled worker in the field could readily appreciate the ways in which the water may be agitated.

The amount of aluminium sulphate used will depend upon the amount of lithium carbonate used. Nevertheless the aluminium sulphate is typically added in an amount such that from 1.0 to 7.0 mole equivalents of aluminium sulphate are added per 1 mole equivalent of lithium carbonate present in the dispersion. In one embodiment the amount of aluminium sulphate 1.0 to 5.0 mole equivalents of aluminium sulphate are added per 1 mole equivalent of lithium carbonate present in the dispersion. In one embodiment the amount of aluminium sulphate 1.5 to 2.5 mole equivalents of aluminium sulphate are added per 1 mole equivalent of lithium carbonate present in the dispersion.

As would be appreciated by a skilled worker in the art lithium carbonate has very low solubility in water and so the dispersion of lithium carbonate in a sugar solution is not clear but rather has a milky appearance (as lithium carbonate is white). As the aluminium sulphate is added a reaction takes place and eventually after the addition of an appropriate amount of aluminium sulphate has taken place the solution becomes clear. Whilst the liquid will have accelerating properties after addition of some aluminium sulphate and before it becomes clear the applicants have found that optimal activity is achieved if an amount of aluminium sulphate is added so that the solution is clear.

The applicants have found that the liquid hardening accelerator produced by the methods of the invention may be used with a large number of hydraulic compositions nevertheless it has been found that it is typically useful in relation to hydraulic compositions containing aluminium. A suitable example of a hydraulic composition that may be accelerated by the liquid hardening composition produced by the present invention is a hydraulic composition containing Portland cement and a calcium sulphoaluminate cement.

As used herein the term "Portland cement" refers to a hydraulic cement that not only hardens by reacting with water but also forms a water-resistant product comprising hydraulic calcium silicates. Portland cement includes Portland cements described in ASTM C150 and European standard EN 197, however, it is to be understood that "Portland cement" is not limited to these classes.

As used herein the term "cementitious" refers to a hydraulic binder including cement; but is not limited to materials traditionally recognised as cements.

The term "calcium sulphoaluminate cement" as used throughout the specification refers to a hydraulic cement containing ye'elimite (4 CaO·3 Al$_2$O$_3$·SO$_3$ (C$_4$A$_3$$\overline{\text{S}}$)). The main hydration products of calcium sulphoaluminate cement is the formation of ettringite and aluminium hydroxide.

As discussed above, the liquid hardening accelerator produced by the method of the present invention finds particular application in hardening of a cementitious composition comprising (i) a cementitious base material, the cementitious base material containing a source of aluminium and a source of calcium; (ii) a calcium sulphoaluminate cement.

The cementitious base material may be of any suitable material containing aluminium and calcium. For example, the cementitious base material could be Portland cement, a Portland cement blend or other cements including Pozzolan-lime cements, slag-lime cements, supersulphated cements. In relation to Portland cement blends, it is understood that the Portland cement may contain supplementary cementitious materials including pozzolanic materials, lime, fly ash, mortar, ground granulated blast furnace slag (GGBS), silica fume, calcined clay, calcined shale, refractory cements, gypsum, expanding cements, sand, rice hull ash, quartz, silica, amorphous silicon dioxide, cement asbestos board (CAB), calcium aluminate cement (CA) or the like. Examples of Portland cement blends include Portland blast-furnace slag cement, Portland-fly ash cement, Portland pozzolan cement, Portland silica fume cement, masonry cement and expansive cement. In one embodiment, the cementitious base material is Portland cement.

As described throughout the specification, the following cement chemist notation is used as follows: C≡CaO; S=SiO$_2$; A=Al$_2$O$_3$; F≡Fe$_2$O$_3$; M=MgO; K=K$_2$O; $\overline{\text{S}}$=SO$_3$; N=Na$_2$O; T=TiO$_2$; P=P$_2$O$_5$; H=H$_2$O; $\overline{\text{C}}$=CO$_3$.

The composition of Portland cements can vary significantly; however, several classes of Portland cement have been described in ASTM C150 and European standard EN 197. Typical Portland cements have a composition of 45-75% C$_3$S, 7-32% C$_2$S, 0-13% C$_3$A, 0-18% C$_4$AF and 2-10% gypsum on a w/w basis.

The main classes of Portland cement as described in ASTM C150 are Types I-V.

Type I Portland cement is a general-purpose cement and is the most common class. Type I cements have a typical composition of 55% C$_3$S, 19% C$_2$S, 10% C$_3$A, 7% C$_4$AF, 2.8% MgO, 2.9% S, with 1% ignition loss and 1% free CaO on a w/w basis.

Type II Portland cement releases less heat compared to Type I Portland cement and requires that the amount of C$_3$A does not exceed 8% on w/w basis. A typical composition of a Type II Portland cement is 51% C$_3$S, 24% C$_2$S, 6% C$_3$A, 11% C$_4$AF, 2.9% MgO, 2.5% $\overline{\text{S}}$, with 0.8% ignition loss and 1% free CaO on a w/w basis.

Type III Portland cement has a relatively high early strength and has particle sizes finer than Type I Portland cement. Type III Portland cement typically has a specific surface area of 50-80% higher than Type I Portland cement. Additionally, a Type III Portland cement has a 3-day compressive strength equal to the 7-day compressive strength of a Type I and II Portland cement and a Type III cement has a 7 day compressive strength equal to the 28-day compressive strength of a Type I and II Portland cement. A typical composition of a Type III Portland cement is 57% C$_3$S, 19%

$C_2S$, 10% $C_3A$, 7% $C_4AF$, 3.0% MgO, 3.1% $\bar{S}$, with 0.9% ignition loss and 1.3% free CaO on a w/w basis.

Type IV Portland cement typically has a low heat of hydration and requires that the amount of $C_3A$ does not exceed 7% and $C_3S$ does not exceed 35% on a w/w basis. Type IV Portland cements are generally used for large concrete structures having a low surface to volume ratio such as dams. A typical composition of a Type IV Portland cement is 28% $C_3S$, 49% $C_2S$, 4% $C_3A$, 12% $C_4AF$, 1.8% MgO, 1.9% $\bar{S}$, with 0.9% ignition loss and 0.8% free CaO on a w/w basis.

Type V Portland cement is used when sulphate resistance is required and the composition does not exceed 5% $C_3A$ on a w/w basis. Additionally, the composition of a Type V Portland cement has a requirement that $C_4AF+2(C_3A)$ does not exceed 20% on a w/w basis. A typical composition of a Type V Portland cement is 38% $C_3S$, 43% $C_2S$, 4% $C_3A$, 9% $C_4AF$, 1.9% MgO, 1.8% $\bar{S}$, with 0.9% ignition loss and 0.8% free CaO on a w/w basis.

Types Ia, IIa and IIIa are variants to Types I-III Portland cements and refers to the addition of an air-entraining agent which is ground into the composition. Further, Types II(MH) and II(MH)A have a similar composition to Type II Portland cement above, however has mild heat release.

According to European standard EN 197, five classes of Portland cement have been described which are different to the classes described in ASTM C150. EN 197 describes Type I Portland cement as Portland cement comprising Portland cement and up to 5% of minor additional constituents; Type II Portland-composite cement comprises Portland cement and up to 35% of other single constituents; Type III Blast furnace cement comprises Portland cement and higher percentages of blast furnace slag; Type IV Pozzolanic cement comprises Portland cement and up to 55% of pozzolanic constituents; and Type V Composite cement comprising Portland cement, pozzolan and blast furnace slag or fly ash.

Calcium sulphoaluminate cements have three main classes; however, a skilled addressee would understand that calcium sulphoaluminate cements are not limited to these classes. Typical calcium sulphoaluminate cements have the following compositions: Type I comprises 7% $C_{12}A_7$, 67% $C_4A_3\bar{S}$, 20% $C_2S$ and 6% $C_4AF$; Type II comprises 5% $C_{12}A_7$, 60% $C_4A_3\bar{S}$, 24% $C_2S$ and 7% $C_4AF$; and Type III comprises 5% $C_{12}A_7$, 52% $C_4A_3\bar{S}$, 30% $C_2S$ and 7% $C_4AF$.

It will be apparent to the skilled addressee that the cementitious base material, and calcium sulphoaluminate cement of the cementitious composition can be mixed in any suitable amount capable of forming a hydrated cementitious product such as grout or the like. In one embodiment, the amount of cementitious base material in the composition is from 5% to 90% on a w/w basis. In one embodiment, the amount of cementitious base material in the composition is from 10% to 90% on a w/w basis. In one embodiment, the amount of cementitious base material in the composition is from 10% to 85% on a w/w basis. In one embodiment, the amount of cementitious base material in the composition is from 10% to 80% on a w/w basis. In one embodiment, the amount of cementitious base material in the composition is from 15% to 80% on a w/w basis. In one embodiment, the amount of cementitious base material in the composition is from 20% to 80% on a w/w basis. In one embodiment, the amount of cementitious base material in the composition is from 25% to 80% on a w/w basis. In one embodiment, the amount of cementitious base material in the composition is from 25% to 75% on a w/w basis. In one embodiment, the amount of cementitious base material in the composition is from 25% to 70% on a w/w basis. In one embodiment, the amount of cementitious base material in the composition is from 30% to 90% on a w/w basis. In one embodiment, the amount of cementitious base material in the composition is from 30% to 85% on a w/w basis. In one embodiment, the amount of cementitious base material in the composition is from 30% to 80% on a w/w basis. In one embodiment, the amount of cementitious base material in the composition is from 30% to 70% on a w/w basis. In one embodiment, the amount of cementitious base material in the composition is from 30% to 60% on a w/w basis. In one embodiment, the amount of cementitious base material in the composition is from 35% to 90% on a w/w basis. In one embodiment, the amount of cementitious base material in the composition is from 40% to 90% on a w/w basis. In one embodiment, the amount of cementitious base material in the composition is from 50% to 90% on a w/w basis. In one embodiment, the amount of cementitious base material in the composition is from 40% to 60% on a w/w basis. In one embodiment, the amount of cementitious base material in the composition is from 40% to 80% on a w/w basis. In one embodiment, the amount of cementitious base material in the composition is from 50% to 80% on a w/w basis. In one embodiment, the amount of cementitious base material in the composition is from 60% to 80% on a w/w basis. In one embodiment, the amount of cementitious base material in the composition is from 65% to 75% on a w/w basis. In one embodiment, the amount of cementitious base material in the composition is from 40% to 70% on a w/w basis. In one embodiment, the amount of cementitious base material in the composition is from 35% to 75% on a w/w basis. In one embodiment, the amount of cementitious base material in the composition is from 50% to 70% on a w/w basis. In one embodiment, the amount of cementitious base material in the composition is from 60% to 70% on a w/w basis. In one embodiment, the amount of cementitious base material in the composition is from 5% to 30% on a w/w basis. In one embodiment, the amount of cementitious base material in the composition is from 10% to 30% on a w/w basis. In one embodiment, the amount of cementitious base material in the composition is from 5% to 20% on a w/w basis. In one embodiment, the amount of cementitious base material in the composition is from 10% to 20% on a w/w basis.

In one embodiment, the amount of the calcium sulphoaluminate cement in the composition is from 5 to 30% on a w/w basis. In one embodiment, the amount of the calcium sulphoaluminate cement in the composition is from 5 to 25% on a w/w basis. In one embodiment, the amount of the calcium sulphoaluminate cement in the composition is from 5 to 20% on a w/w basis. In one embodiment, the amount of the calcium sulphoaluminate cement in the composition is from 5 to 15% on a w/w basis. In one embodiment, the amount of the calcium sulphoaluminate cement in the composition is from 10 to 30% on a w/w basis. In one embodiment, the amount of the calcium sulphoaluminate cement in the composition is from 15 to 30% on a w/w basis. In one embodiment, the amount of the calcium sulphoaluminate cement in the composition is from 20 to 30% on a w/w basis. In one embodiment, the amount of the calcium sulphoaluminate cement in the composition is from 10 to 20% on a w/w basis. In one embodiment, the amount of the calcium sulphoaluminate cement in the composition is from 5 to 90% on a w/w basis. In one embodiment, the amount of the calcium sulphoaluminate cement in the composition is from 5 to 85% on a w/w basis. In one embodiment, the amount of the calcium sulphoaluminate cement in the composition is from 5 to 80% on a w/w basis. In one embodiment, the amount of the calcium sulphoaluminate cement in the composition is from 10 to 80% on a w/w basis. In one embodiment, the amount of the calcium sulphoaluminate cement in the composition is from 10 to 75% on a w/w basis. In one embodiment, the amount of the calcium sulphoaluminate cement in the composition is from 15 to 70% on a w/w basis. In one embodiment, the amount of the calcium sulphoaluminate cement in the composition is from 20 to 90% on a w/w basis. In one embodiment, the amount of the calcium sulphoaluminate cement in the composition is from 20 to 80% on a w/w basis. In one embodiment, the amount of the calcium sulphoaluminate cement in the composition is from 20 to 70% on a w/w basis. In one embodiment, the amount of the calcium sulphoaluminate cement in the composition is from 25 to 70% on a w/w basis. In one embodiment, the amount of the calcium sulphoaluminate cement in the composition is from 30 to 90% on a w/w basis. In one embodiment, the amount of the calcium sulphoaluminate cement in the composition is from 35 to 85% on a w/w basis. In one embodiment, the amount of the calcium sulphoaluminate cement in the composition is from 40 to 80% on a w/w basis. In one embodiment, the amount of the calcium sulphoaluminate cement in the composition is from 50 to 80% on a w/w basis. In one embodiment, the amount of the calcium sulphoaluminate cement in the composition is from 20 to 60% on a w/w basis. In one embodiment, the amount of the calcium sulphoaluminate cement in the composition is from 5 to 50% on a w/w basis. In one embodiment, the amount of the calcium sulphoaluminate cement in the composition is from 20 to 40% on a w/w basis.

It is to be understood that in certain embodiments the hydraulic composition to be accelerated by the accelerator produced by the present invention may contain an additional sulphate source. Examples of suitable additional sulphate sources include aluminium sulphate, calcium sulphate, sodium sulphate, barium sulphate, strontium sulphate, lead sulphate, copper sulphate, magnesium sulphate, iron sulphate, potassium sulphate, nickel sulphate, zinc sulphate, ammonium sulphate and caesium sulphate. In one embodiment, the sulphate source is calcium sulphate.

It will be appreciated that the additional sulphate source can be added to the cementitious composition in any suitable amount. In one embodiment, the amount of sulphate source in the composition is from 5 to 90 wt % on a w/w basis. In one embodiment, the amount of sulphate source in the composition is from 5 to 85 wt % on a w/w basis. In one embodiment, the amount of sulphate source in the composition is from 10 to 80 wt % on a w/w basis. In one embodiment, the amount of sulphate source in the composition is from 15 to 75 wt % on a w/w basis. In one embodiment, the amount of sulphate source in the composition is from 15 to 70 wt % on a w/w basis. In one embodiment, the amount of sulphate source in the composition is from 20 to 70 wt % on a w/w basis. In one embodiment, the amount of sulphate source in the composition is from 25 to 80 wt % on a w/w basis. In one embodiment, the amount of sulphate source in the composition is from 30 to 80 wt % on a w/w basis. In one embodiment, the amount of sulphate source in the composition is from 35 to 80 wt % on a w/w basis. In one embodiment, the amount of sulphate source in the composition is from 40 to 80 wt % on a w/w basis. In one embodiment, the amount of sulphate source in the composition is from 40 to 70 wt % on a w/w basis. In one embodiment, the amount of sulphate source in the composition is from 40 to 60 wt % on a w/w basis. In one embodiment, the amount of sulphate source in the composition is from 50 to 90 wt % on a w/w basis. In one embodiment, the amount of sulphate source in the composition is from 60 to 90 wt % on a w/w basis. In one embodiment, the amount of sulphate source in the composition is from 60 to 80 wt % on a w/w basis. In one embodiment, the amount of sulphate source in the composition is from 60 to 70 wt % on a w/w basis. In one embodiment, the amount of sulphate source in the composition is from 5 to 50 wt % on a w/w basis. In one embodiment, the amount of sulphate source in the composition is from 5 to 45 wt % on a w/w basis. In one embodiment, the amount of sulphate source in the composition is from 5 to 40 wt % on a w/w basis. In one embodiment, the amount of sulphate source in the composition is from 5 to 35 wt % on a w/w basis. In one embodiment, the amount of sulphate source in the composition is from 5 to 30 wt % on a w/w basis. In one embodiment, the amount of sulphate source in the composition is from 5 to 25 wt % on a w/w basis. In one embodiment, the amount of sulphate source in the composition is from 10 to 50 wt % on a w/w basis. In one embodiment, the amount of sulphate source in the composition is from 15 to 50 wt % on a w/w basis. In one embodiment, the amount of sulphate source in the composition is from 20 to 50 wt % on a w/w basis. In one embodiment, the amount of sulphate source in the composition is from 25 to 50 wt % on a w/w basis. In one embodiment, the amount of sulphate source in the composition is from 10 to 40 wt % on a w/w basis. In one embodiment, the amount of sulphate source in the composition is from 20 to 30 wt % on a w/w basis.

EXAMPLES

The present invention will now be described with reference to the following examples.

Those skilled in the art will appreciate that the invention described herein is susceptible to variations and modifications other than those specifically described. It is understood that the invention includes all such variations and modifications which fall within the spirit and scope of the present invention.

Example 1

General Procedure 1 for Manufacturing Accelerant of the Invention

The desired amount of water present in the final composition is added to a container followed by addition of the desired amount of sugar. The water in the container may be agitated to aid dissolution of the sugar depending on the amount of sugar to be added. Following completion of addition of the sugar the desired amount of lithium carbonate is added to the water to form a dispersion of the lithium carbonate in a sugar solution. The water may be agitated or mixed during addition of the lithium carbonate. Following completion of the addition of the lithium carbonate the desired amount of aluminium sulphate is then added over a period of time (typically determined by the need to control the evolution of gas from the solution) to form the final liquid hardening accelerator. Once again the dispersion of lithium carbonate in a sugar solution may be agitated or mixed during addition of aluminium sulphate.

Example 2

General Procedure 2 for Manufacturing Accelerant of the Invention

The desired amount of water present in the final composition is added to a container followed by addition of the desired amount of lithium carbonate. The water in the container may be agitated during addition of the lithium carbonate. Following completion of addition of the lithium carbonate the desired amount of sugar is added to the water to form a dispersion of the lithium carbonate in a sugar solution. The water may be agitated or mixed during addition of the sugar. Following completion of addition of the sugar the desired amount of aluminium sulphate is then added over a period of time (typically determined by the need to control the evolution of gas from the solution) to form the final liquid hardening accelerator. Once again the dispersion of lithium carbonate in a sugar solution may be agitated or mixed during addition of aluminium sulphate.

Example 3

General Procedure 3 for Manufacturing Accelerant of the Invention

The desired amount of water present in the final composition is added to a container followed by addition of the desired amounts of sugar and lithium carbonate (simultaneous addition). The water in the container may be agitated to aid dissolution of the sugar depending on the amount of sugar to be added. Following completion of addition of the sugar and lithium the desired amount of aluminium sulphate is then added over a period of time (typically determined by the need to control the evolution of gas from the solution) to form the final liquid hardening accelerator. Once again the dispersion of lithium carbonate in a sugar solution may be agitated or mixed during addition of aluminium sulphate.

Example 4

Following the general procedure outlined in example 1 a liquid hardening accelerator was produced using 44.21 g water, 2.13 g lithium carbonate, 1.53 g sucrose and 52.13 g aluminium sulphate. The liquid hardening composition thus produced was a clear liquid.

Example 5

Following the general procedure outlined in example 1 a liquid hardening accelerator was produced using 36.25 g water, 6.40 g lithium carbonate, 0.28 g sucrose and 57.06 g aluminium sulphate. The liquid hardening composition thus produced was a clear liquid.

Example 6

Following the general procedure outlined in example 1 a liquid hardening accelerator was produced using 49.37 g water, 1.93 g lithium carbonate, 1.39 g sucrose and 47.13 g aluminium sulphate. The liquid hardening composition thus produced was a clear liquid.

Example 7

Comparison Between the Liquid Hardening Accelerator of the Invention and a Commercial Product There are two standard test methods available for hardening of cementitious materials namely:

ASTM C191-13 Standard Test Methods for Time of Setting of Hydraulic Cement by Vicat Needle BS EN 196-3:2005+A1:2008 Methods of testing cement. Determination of setting times and soundness.

The standard BS test was used except that it was varied to use 5% accelerator levels to allow sufficient time to mix the paste before set is attained. The OPC used (Mitsubishi SL Cement-Sunstate cement) for the evaluation was found to have a standard consistency at a w:p of 0.315. All testing was carried out at this W:P. Mixing times were reduced to two mins due to flash setting of the paste. As per the Mineset (BASF) instruction sheet, the accelerator was used (between 3 and 10% i.e.) 5% on OPC and included as part of the binder in the W:P ratio, i.e. Total water=0.315×(OPC+5% accelerator). The accelerator was dissolved in the mix water prior to adding to the Portland cement. The mix was mixed for two minutes and then cast into the conical moulds. The composition in the final blend was 500 g sample 25 g, accelerator and 165.375 water.

Needle penetration from surface contact was recorded immediately and at 5 minute intervals with the needle penetration depth being recorded. Results as follows:

TABLE 1

| Vicat penetration in mm over time | | | |
|---|---|---|---|
| Time (mins) | Control | Commercial Hardener | Hardener of Example 4 |
| 0 | 40 | 40 | 40 |
| 5 | 40 | 5 | 36 |
| 10 | 40 | 3 | 26 |
| 15 | 40 | 2 | 10 |
| 20 | 40 | 1 | 3 |
| 25 | 37 | 0 | 0 |
| 30 | 37 | 0 | 0 |
| 35 | 37 | 0 | 0 |
| 40 | 37 | 0 | 0 |
| 45 | 37 | 0 | 0 |

As can be seen whilst there is a short induction period for the liquid hardener of the present invention in comparison to the commercial product after 25 minutes the liquid hardening accelerator of the present invention achieves the same level of cure as the commercial produce.

The invention claimed is:

1. A method of making a liquid hardening accelerator for a hydraulic composition, the method comprising:
   (a) adding sugar and lithium carbonate to water to form a dispersion of the lithium carbonate in a sugar solution;
   (b) adding aluminium sulphate to the dispersion to form a liquid hardening accelerator.

2. The method according to claim 1 wherein the water is at a temperature of from 20° C. to 40° C.

3. The method according to claim 1 wherein the water is agitated during the addition of the lithium carbonate.

4. The method according to claim 1 wherein the dispersion is agitated during the addition of the aluminium sulphate.

5. The method according to claim 1 wherein in step (a) the sugar and lithium carbonate are added simultaneously.

6. The method according to claim 1 wherein the sugar and lithium carbonate are added sequentially.

7. The method according to claim 6 wherein in step (a) the sugar is added first followed by the lithium carbonate.

8. The method according to claim 6 wherein in step (a) the lithium carbonate is added first followed by the sugar.

9. The method according to claim 1 wherein the sugar is sucrose.

10. The method according to claim 1 wherein the aluminium sulphate is added slowly over a period of time of from 1 to 20 minutes.

11. The method according to claim 1 wherein the aluminium sulphate is added in the form of a powder.

12. The method of producing a cured article from a hydraulic composition, the method comprising mixing the hydraulic composition with a liquid hardening composition produced according to claim 1.

13. The method according to claim 12 wherein the hydraulic composition comprises a hydraulic fraction, an aggregate fraction, and water.

14. The method according to claim 12 wherein the liquid hardening composition is added to the hydraulic composition at an outlet of a spray jet for the hydraulic composition.

15. The method according to claim 13 wherein the liquid hardening composition is added to the hydraulic composition at an outlet of a spray jet for the hydraulic composition.

16. A method of making a liquid hardening accelerator for a hydraulic composition, the method comprising:
   (a) adding sugar and lithium carbonate to water to form a dispersion of the lithium carbonate in a sugar solution; and
   (b) adding aluminium sulphate to the dispersion to form a liquid hardening accelerator;
   The method according to claim 1 wherein the sugar is added in an amount of from 0.1 g to 30.0 g per 100 ml of water.

17. A method of making a liquid hardening accelerator for a hydraulic composition, the method comprising:
   (a) adding sugar and lithium carbonate to water to form a dispersion of the lithium carbonate in a sugar solution; and
   (b) adding aluminium sulphate to the dispersion to form a liquid hardening accelerator;
   wherein the lithium carbonate is added in an amount of from 0.1 g to 30.0 g per 100 ml of water.

18. A method of making a liquid hardening accelerator for a hydraulic composition, the method comprising:
   (a) adding sugar and lithium carbonate to water to form a dispersion of the lithium carbonate in a sugar solution; and
   (b) adding aluminium sulphate to the dispersion to form a liquid hardening accelerator;
   wherein the amount of aluminium sulphate added is from 1 to 7 mole equivalents per 1 mole equivalent of lithium carbonate present.

19. The method of producing a cured article from a hydraulic composition, the method comprising mixing the hydraulic composition with a liquid hardening composition produced according to claim 18.

20. The method according to claim 19 wherein the liquid hardening composition is added to the hydraulic composition at an outlet of a spray jet for the hydraulic composition.

* * * * *

UNITED STATES PATENT AND TRADEMARK OFFICE
CERTIFICATE OF CORRECTION

Page 1 of 1

PATENT NO. : 10,793,479 B2
APPLICATION NO. : 16/065799
DATED : October 6, 2020
INVENTOR(S) : Michael Scott Archer et al.

It is certified that error appears in the above-identified patent and that said Letters Patent is hereby corrected as shown below:

In the Claims

Column 14, Lines 2-3, Claim 16:
After "a liquid hardening accelerator"
Delete "The method according to claim 1"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*